Jan. 7, 1969    C. G. VINER    3,420,440
AUTOMATIC BALANCE VALVE FOR HEAT EXCHANGING FLUID
Filed March 10, 1965
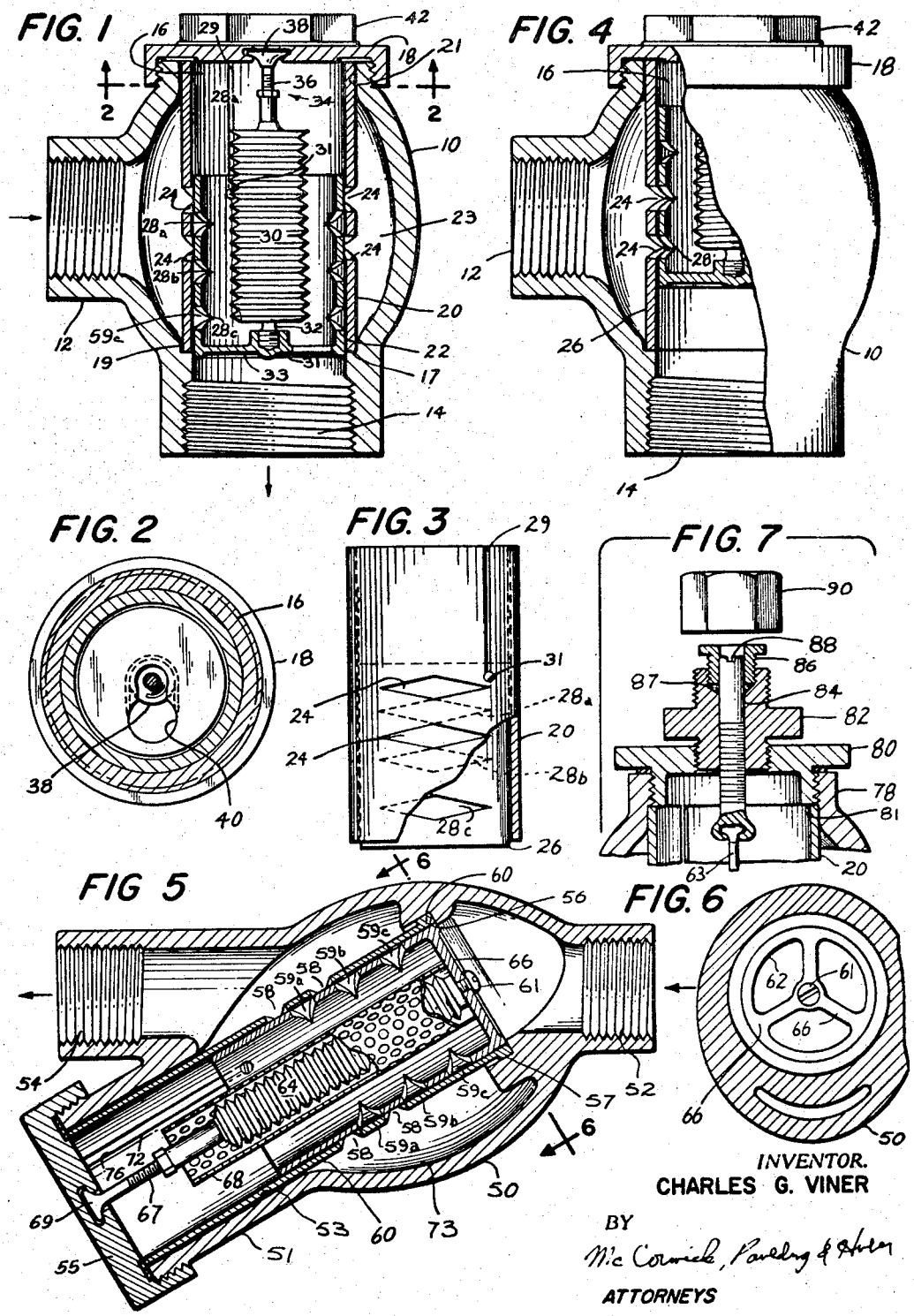
INVENTOR.
CHARLES G. VINER
ATTORNEYS United States Patent Office 3,420,440
Patented Jan. 7, 1969

1

3,420,440
AUTOMATIC BALANCE VALVE FOR HEAT
EXCHANGING FLUID
Charles G. Viner, P.O. Box 127, Old Turnpike Road,
North Woodstock, Conn. 06257
Filed Mar. 10, 1965, Ser. No. 438,519
U.S. Cl. 236—93                                    7 Claims
Int. Cl. G05d 23/275

This invention relates to balance valves for use in the return lines of fluid fed heat exchanging units or branches of a heating or cooling system, and deals more particularly with a valve which automatically regulates the flow of heat exchanging fluid in such a return line to optimize the fluid temperature differential across the heat exchanging unit or branch A general object of the present invention is to provide a balance valve for use in the return line of the heat exchanging unit or branch, which valve automatically regulates the flow of fluid being circulated through said unit, or branch, to maintain a relatively constant fluid temperature differential thereacross.

Another object of the present invention is to provide a dual range balance valve for maintaining a first predetermined temperature range across a heat exchanging unit or branch when the same is used as a heater, and for maintaining a second predetermined temperature range thereacross when said unit or branch is used for cooling purposes.

Still another object of the present invention is to provide a balance valve for a hot water radiator adapted to receive hot water at a constant temperature, which valve is responsive to fluctuations in the temperature of the water being discharged from said radiator and automatically decreases or increases the flow of water to the radiator so as to maintain the drop in water temperature across the radiator within a predetermined range.

Still another object of the present invention is to provide a balance valve for a cold water cooling unit adapted to receive cold water at a constant temperature, which valve is responsive to fluctuations in the temperature of the water being discharged from said unit and automatically decreases or increases the flow of water through the unit so as to maintain the rise in water temperature across the unit within a predetermined range.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a vertical sectional view through a balance valve embodying the present invention, this view showing the valve sleeves with their side ports out of alignment to provide a closed condition of the valve.

FIG. 2 is a sectional view of the FIG. 1 valve taken along line 2—2 of that figure.

FIG. 3 is an elevational view of the telescopically arranged valve sleeves of the FIG. 1 valve, part of the outer sleeve being shown broken away.

FIG. 4 is a view partly in section and partly in elevation of the FIG. 1 valve showing the valve sleeves with their side ports aligned to provide an open condition of the valve.

FIG. 5 is a vertical sectional view of a valve comprising an alternative embodiment of the present invention.

FIG. 6 is a sectional view of the FIG. 5 valve taken along the line 6—6 of that figure.

2

FIG. 7 is a vertical sectional view of an alternative construction for the upper portion of the FIG. 1 valve.

Referring now to the drawing in greater detail, FIGS. 1 to 4 show a balance valve of the present invention for connection between two right angle sections of return pipe in a heating or cooling system which circulates a heat exchanging fluid. As shown, the valve comprises a hollow housing 10 having inlet and outlet ports 12 and 14 respectively. A third opening 16 is located opposite the outlet port. The housing is externally threaded adjacent the opening 16 and the opening is normally closed by a cap 18 which is internally threaded so as to threadably engage the housing. With the cap 18 closing the opening 16, a path for the flow of fluid between the inlet and outlet ports is provided in the housing.

For controlling the flow of fluid through the flow path, a first tubular sleeve 20 is positioned in and fixed relative to the housing. The lower end 22 of this sleeve is open and is positioned in and across the flow path so that all of the fluid passing between the inlet and outlet ports is also constrained to flow through the sleeve. This is accomplished, as shown in FIG. 1, by counterboring or otherwise forming the housing adjacent the inner end of the outlet port 14 to provide a flat annular seat 17 for engaging the end of the sleeve and a short cylindrical surface 19 adjacent the seat 17 for engaging the outer cylindrical surface of the sleeve. The opposite or upper end of the sleeve 20 is received in the opening 16 which is defined by a short cylindrical internal housing surface 21 of approximately the same diameter as the outer surface of the sleeve. The sleeve 20 is therefore held axially in place in the housing by the cap 18 and seat 17 and is laterally located or centered by the two cylindrical surfaces 19 and 21. Between the two cylindrical surfaces 19 and 21, the interior of the housing bulges outwardly to provide a chamber 23 surrounding the sleeve.

In order to permit the flow of fluid through the sleeve 20, its side wall is provided with a number of ports. These ports may be of various different shapes and arrangements without departing from the invention, however, they preferably, and as shown consist of two diametrically opposite sets of generally diamond shaped ports 24, 24 there being two such ports in each set as shown in FIG. 1. A second tubular sleeve 26 is telescopically received inside the first tubular sleeve 20 and includes ports which are brought into and out of alignment with the ports of the first sleeve to permit or prevent the flow of fluid therethrough as a result of relative axial movement between the two sleeves. In the illustrated case, the ports in the inner sleeve 26 comprise two diametrically opposite sets of diamond shaped ports generally similar in size and shape and axial spacing to the size and shape and axial spacing of ports 24, 24. Each set of ports in the sleeve 26, however, comprises three ports 28a, 28b and 28c as compared to the two ports in each set in the sleeve 20. The inner sleeve 26 is so angularly positioned relative to the outer sleeve 20 that each set of ports 28a, 28b and 28c in the inner sleeve is aligned with a corresponding one of the sets of ports 24, 24 in the outer sleeve as shown. At least one elongated slot 29 is provided in the outer sleeve 20 and receives a pin 31 attached to the inner sleeve 26 so that the ports in the sleeves remain in the angular relationship shown in the drawing. It will further be noted that the spacing of adjacent ports 24, 24 and 28a, 28b and 28c on each sleeve is approximately equal to the maximum axial length of each port so that at one axial position of the sleeve 26 relative to the sleeve 20, as shown in FIGS. 1 and 3, the ports 24, 24 are closed by the portions of the sleeve 26 located between the ports 28a, 28b and 28c.

A sufficient radial clearance is, however, maintained between the two sleeves so that a small amount of fluid will pass through the valve even when the sleeves are in their fully closed positions as shown in FIG. 1. Preferably, this clearance is such that when the sleeves are in their fully closed positions, the flow through the valve will be about five percent of the flow through the valve when the sleeves are in their full open positions.

A thermostatic actuator 30 is located inside of the sleeves 20 and 26 and serves to position the inner sleeve axially of the outer sleeve in response to the temperature of the water or the other fluid passing through the valve. The actuator is connected between the inner sleeve 26 and the cap 18. To provide the connection with the sleeve, the sleeve includes a spider at its lower end having a hub and three angularly spaced legs, such as shown at 33, which are integrally connected to the sleeve 26. At its lower end, the actuator includes a threaded stem 32 which is threaded into a threaded opening in the hub, and at its upper end it includes an adjustable length stem 34 having an enlarged head 38 which is loosely received in a keyhole-shaped slot formed in the inner portion of the cap 18. The actuator is of elongated shape and expands and contracts longitudinally in response to increases and decreases in the surrounding temperature. More particularly, the illustrated actuator comprises a metallic fluid-filled bellows located between the two stems 32 and 34. The fluid used inside the bellows plus the elasticity of the metal bellows combine to produce a thermally sensitive device responsive to slight changes in the surrounding temperature. The fluid used in the bellows may vary depending on various factors such as the temperature range of the fluid with which the valve is to be used. Where the valve is adapted for use with both heating and cooling fluid, so as to encounter a temperature range of about 40° F. to 170° F., the fluid commonly known as P-Cymene has been found to yield satisfactory results as a filler for the bellows.

Minor adjustments in the length of the actuator 30 can be readily made by means of the adjustable stem 34 to control quite accurately the fluid temperatures at which the valve opens and closes. As shown in FIG. 1, the adjustable stem comprises an externally threaded upper part which is threaded into a conforming lower part so that by threading the upper part into or out of the lower part, the length of the stem may readily be varied. A lock nut 36 is received on the upper part for releasably holding the two parts in the relative positions to which they are set. As so arranged, the user need only remove the cap from the housing in order to adjust the length of the actuator or to replace the actuator or sleeves. On its outer portion, the cap may, as shown in FIG. 1, be shaped to define a nut 42 to facilitate its removal from and replacement on the valve body by means of a conventional wrench.

Turning now to the operation of the FIGS. 1 to 4 valve, as mentioned hereinabove the valve shown is intended for use in the return line of a particular heat exchanging unit or branch of a heating or cooling system. More specifically, the valve is designed to function as a moderating valve to balance the various heat exchanging units or system branches against one another to prevent excessive temperature differentials from occuring across one or more of the units or branches. In a heating system, for example, a particular hot water radiator receives heated water at a preferably fixed or constant temperature which may, for example, be taken to be approximately 170° F. The radiator unit dissipates heat to the surrounding space and ideally discharges this water at another fixed or constant temperature which may, for example, be taken to be approximately 150° F. If the space requires more heat, the preferred approach is to increase the flow of water through the associated radiator so that the discharge temperature is not lowered excessively. Therefore, in using the illustrated balance valve, the valve is installed at the discharge end of a radiator, or at the end of a branch of the heating system, and is adjusted by changing the length of the stem 34 until the desired temperature drop across the radiator or branch is obtained. For example, in the example given, the valve is adjusted until the water discharged from the radiator is discharged at a temperature of approximately 150° F. to produce a 20° temperature drop across the radiator. With the valve so adjusted, the inner sleeve 26 will be positioned at about the position shown in FIG. 1, or slightly above such position, so that the ports 24, 24 of the outer sleeve will be completely or at least partially blocked by the portion of the inner sleeve located above the port 28a and by the portion of the inner sleeve located between the ports 28a and 28b. Generally it is found that the desired setting of the valve is closely approached by setting the valve at the factory to cause the ports 28a and 28b to be fully aligned with the ports 24, 24 at a temperature of approximately 120° F.

After the valve 10 is adjusted to produce the desired temperature drop across the radiator or branch for one heating load, assume that the heating load is increased, for example, by the outside temperature dropping or by the opening of a window in a room containing a radiator with which the valve is associated. As a result of this change in the load, the radiator will transfer more heat to the surroundings, and the temperature at the discharge end of the radiator will drop. This drop in temperature in turn causes the actuator 30 to contract and to move the ports 28a and 28b of the inner sleeve to a more open position relative to the ports 24, 24 of the outer sleeve. Accordingly more water is permitted to flow through the radiator. As more water does flow through the radiator, the temperature at the discharge side again rises and the valve moves toward a more closed position. It will therefore be obvious that the valve acts to modulate the flow through the radiator or branch to maintain the flow at a rate sufficient to meet the heating load without drastically changing the temperature at the discharge side of the radiator.

It is also a feature of the valve of FIGS. 1 to 4 that it is operable in either a heating or a cooling system, and in this regard it should be noted that the sleeves 20 and 26 are so designed and the actuator 30 is so selected that at the normal discharge temperature of a heating unit, that is at a temperature of approximately 150° F., the inner sleeve 26 is approximately in the position shown in FIG. 1 at which the ports 24, 24 in the outer sleeve are closed by the upper portion of the inner sleeve 26 and by the portion of the sleeve 26 located between the ports 28a and 28b. At a temperature of approximately 120° F., the actuator positions the inner sleeve so that the valve is fully open by virtue of the ports 28a and 28b being fully aligned with the ports 24, 24. At a temperature of approximately 95° F., the valve actuator positions the inner sleeve so that the valve is again fully closed by virtue of the ports 24, 24 being closed by the portions of the inner sleeve located between the ports 28a and 28b and between the ports 28b and 28c. At approximately 65° F. the actuator positions the inner sleeve so that the valve is again fully open by virtue of the ports 28b and 28c being aligned with the ports 24, 24; and at a temperature of approximately 40° F. the actuator positions the inner sleeve so that the valve is again fully closed by virtue of the ports 24, 24 being closed by the lower end of the sleeve 26 and by the portion of the sleeve located between the ports 28b and 28c.

Now, assume that the valve 10 is used in a cooling system and is attached to the discharge side of a heat exchanging unit through which chilled water is passed with the desired temperature drop across the heat exchanging unit being such that a discharge temperature of approximately 40° F. is obtained. If the discharge temperature is 40° F., the valve will remain in a full closed condition and only a small amount of water will pass therethrough. Now if the cooling load on the heat exchanging unit increases, the temperature of the discharged water will rise and will cause the actuator 30 to expand to move the inner sleeve 26 to a more open position relative to the outer sleeve 20 and to thereby allow more chilled water to flow through the unit. As more water passes through the unit the discharge temperature will drop and the bellows will contract to reduce the rate of flow. The result is a modulating action which adjusts the flow through the heat exchanging unit to meet the heating load while nevertheless maintaining the discharge temperature, or the temperature drop across the heat exchanging unit, at approximately the design requirements of the cooling system.

It will, of course, be understood that by properly adjusting the adjustable stem 34 of the actuator 30, the valve may be caused to maintain any selected discharge temperature both on a heating system and on a cooling system. Also, the valve may be used in a system used both for heating and cooling and will automatically switch from heating to cooling operation as the system is changed from one mode of operation to the other.

FIGS. 5 and 6 show an alternative embodiment of the invention comprising a valve adapted for connection between two aligned sections of return pipe in a heating or cooling system, the valve being referred to as a straight-through valve. As shown in these figures, the valve comprises a hollow housing 50 having aligned inlet and outlet ports 52 and 54, respectively, and a generally cylindrical portion 51 which is arranged at an angle to the axis of the ports 52 and 54 and which portion is open at its outer end and includes a generally cylindrical internal surface 53. The portion 51 is externally threaded adjacent its outer end and the opening therein is normally closed by a cap 55 threadably received thereon.

For controlling the flow of fluid through the valve, the valve contains two tubular sleeves 60 and 62 which are generally similar in function and shape to the sleeves 20 and 26 of the FIGS. 1 to 4 valve. The sleeve 60 is the outer sleeve and is fixed relative to the housing 50 and so arranged that all of the flow through the valve is constrained to flow therethrough. Adjacent the inner end of the sleeve 60 the housing 50 includes an inwardly extending annular portion which is counterbored to provide an annular seat 56 engageable with the inner end of the sleeve 60 and to provide a generally cylindrical internal surface 57 engageable with the outer surface of the sleeve. The outer end portion of the sleeve 60 is surrounded by the surface 53 of the portion 51 and its outer end surface is engageable with the cap 55. Therefore, the sleeve 60 is axially retained in place in the valve by the seat 56 and the cap 55 and is radially retained in place by the cylindrical surfaces 53 and 57. Formed in the side wall of the sleeve 60 are ports 58, 58 which are arranged and shaped generally similarly to the ports 24, 24 of the sleeve 20 of the FIGS. 1 to 4 valve.

Telescopically received in the sleeve 60 is the inner sleeve 62 which contains ports 59a, 59b and 59c generally similar to the ports 28a, 28b and 28c, respectively, of the valve of FIGS. 1 to 4. The inner sleeve 62 is moved axially relative to the sleeve 60 by a bellows type thermostatic actuator 64 which at its inner end is connected to the sleeve by a screw 61 passing through the central portion of a spider formed integral with the inner end of the sleeve 62. As best shown in FIG. 6, the spider includes three equally angularly spaced arms 66, 66 leaving openings between the arms for the passage of water or other heat exchange fluid. The inner sleeve 62 is maintained at the proper angular relationship to the outer sleeve 60 by a slot 70 formed in the sleeve 60 and by a pin or screw 72 fastened to the sleeve 60 and having an outwardly projecting portion slidably received in the slot. At its outer end the actuator 64 is releasably connected to the cap 55 by an adjustable length stem 67 generally similar to the stem 34 of FIG. 1, the outer end of the stem including an enlarged head 69 which is received in a keyhole-shaped slot formed in the inner portion of the cap 55 to permit the stem to be readily removed from the cap when the cap is removed from the valve housing.

Surrounding the inner portions of the sleeves 60 and 62 the housing 50 is bulged outwardly to provide a chamber 73. In normal use of the valve the water or other heat exchange fluid enters the inlet port 52, passes through the inner ends of the sleeves 60 and 62, and then passes outwardly into the chamber 73 through the ports in the sleeves. From the chamber 73 the fluid then flows out of the valve through the outlet port 54. Sufficient clearance is preferably maintained between the two sleeves so that even when the inner sleeve is at a fully closed position relative to the outer sleeve, some flow through the valve will take place, the rate of flow being approximately five percent of the flow obtained with the valve in a full open condition. The ports 58, 58 and 59a, 59b and 59c are so shaped and arranged that the valve 49 may be adjusted to open and close at various selected temperatures such as those set forth above in connection with the valve of FIGS. 1 to 4. The sleeves 60 and 62 and the actuator 64 are, however, somewhat longer than the sleeves 20 and 26 and actuator 30 of the FIGS. 1 to 4 valve, and in order to prevent buckling or lateral displacement of the actuator, the valve also preferably includes a perforated guard 68 which surrounds the actuator 64 and which is attached to the inner end of the inner sleeve 62 by the screw 61 as shown in FIG. 5.

In both the valve of FIGS. 1 to 4 and the valve of FIGS. 5 and 6, the adjustment of the valve is made by unscrewing the cap of the valve and adjusting the associated adjustable length stem 34 or 67. Where it is desired that this adjustment be capable of being made without removing the valve cap, the construction of FIG. 7 may be used. In this figure, the illustrated cap construction is shown in association with a valve body 78 generally similar to the valve body of the FIG. 1 valve, but the same general construction may also be employed with a straight-throught type valve such as shown in FIGS. 5 and 6.

Referring to FIG. 7, the valve body 78 adjacent the upper end of the sleeve 20 is internally threaded and threadably receives a cap 80 having an annular inner end 81 which is engageable with the sleeve 20 to axially retain the sleeve in place in the valve housing. The cap 80 has a centrally located threaded aperture which threadably receives a plug 82, the plug having a lower threaded stem threaded into the cap 80, an intermediate portion shaped to receive a wrench for tightening the plug relative to the cap, and an upper threaded stem. The plug 82 contains a central threaded aperture which threadably receives a connecting member 84. The member 84 extends downwardy beyond the cap 80 and is connected with a stem 83 fixed to the upper end of the associated actuator (not shown). The connection between the member 84 and the stem 83 is such that the two parts are axially fixed relative to one another while the member 84 is nevertheless free to rotate relative to the stem 83. As shown, the upper end of the stem 83 includes an enlarged head which is fitted into a socket in the lower end of the member 84 with the lower end of the member being swaged or otherwise pressed inwardly to retain the head in the socket.

Adjacent its upper end, the plug 82 is counterbored and internally threaded to receive a packing nut 86. Between the packing nut 86 and the plug 82 is a packing gland 87 which is forced by the packing nut 86 against a smooth portion of the member 84 to form a water tight seal, the packing nut 86 being centrally apertured to receive a smooth upper portion of the member 84, and the top end of the member 84 having a slot 88 therein to permit the same to be adjusted by means of a screwdriver. It will, of course, be obvious that as the member 84 is turned in one direction or another to thread the same into or out of the plug 82, the stem 83 will be raised or lowered to adjust the associated inner sleeve with respect to the outer sleeve 20 and to thereby vary the temperatures at which the valve will open and close. A dust cap 90 is also preferably provided to normally cover the packing nut 86, the cap being internally threaded so as to be threadably receivable on the upwardly extending externally threaded stem of the plug 82. Therefore, the valve as shown in FIG. 7 may be easily readily adjusted from outside of the valve and without shutting down the associated heating system by merely removing the dust cap 90 to gain access to the slot 88 of the member 84.

I claim:
1. An automatic balance valve comprising a hollow housing defining a chamber and first and second ports each of which communicates with said chamber, means in said housing defining an annular seat adjacent said first port, said housing further including an opening communicating with said chamber, a first generally cylindrical internal surface extending inwardly from said opening, and a second generally cylindrical internal surface adjacent said seat extending toward and coaxial with said first generally cylindrical surface, a cap threadably connected with said housing and closing said opening, a first tubular sleeve positioned in said housing with one end portion received by said first generally cylindrical internal surface and with its other end portion received by said second generally cylindrical internal surface, said sleeve being engageable with said annular seat and with said cap to limit its axial movement relative to said housing and having an open end adjacent said first port, said first sleeve having a portion intermediate said end portions thereof which cooperates with said housing to define a chamber portion in communication with said second port, a second sleeve telescopically received in said first sleeve, said two sleeves including a plurality of ports in their side walls which are arranged in circumaxially spaced sets so as to be brought into and out of registration as said second sleeve is moved axially of said first sleeve, a thermostatic actuator located wholly inside of said second sleeve, means fixing one end of said actuator to said second sleeve, and means fixing the other end of said actuator to said housing.

2. A balance valve as defined in claim 1 further characterized by said means for fixing said actuator to said second sleeve including a spider on the end of said second sleeve adjacent said first port, and means connecting said actuator to said spider.

3. A balance valve as defined in claim 1 further characterized by said means for fixing said actuator to said housing including means defining a keyhole-shaped slot in the inner portion of said cap, and a stem connected with said actuator and having an enlarged head received in said keyhole slot.

4. A balance valve as defined in claim 3 further characterized by means for adjusting the length of said stem.

5. A balance valve as defined in claim 1 further characterized by said means for fixing said actuator to said housing including a stem connected with said actuator, means defining a threaded opening extending through said cap, and a connecting member threadably received in said opening and having a portion extending inwardly beyond said cap and rotatably connected with said stem.

6. A balance valve as defined in claim 1 wherein said first and second ports are arranged at right angles to one another in said housing, said opening being located opposite to said first portion in said housing.

7. A balance valve as defined in claim 1 wherein said first and second ports are arranged on a common port axis and at opposite ends of said housing, and said opening and said cylindrical surfaces defined in said housing having a common axis which is inclined with respect to said common port axis.

References Cited

UNITED STATES PATENTS

| | | | |
|---|---|---|---|
| 1,696,410 | 12/1928 | Palm | 236—34 |
| 853,504 | 5/1907 | Eddy | 236—93 |
| 1,611,650 | 12/1926 | Lawler | 236—12 |
| 1,752,116 | 3/1930 | Smith | 236—34.5 |
| 1,980,310 | 11/1934 | Ames | 236—12 |
| 2,575,100 | 11/1951 | Duey | 236—93 |
| 2,758,792 | 8/1956 | Rice et al. | 236—12 |

EDWARD J. MICHAEL, *Primary Examiner.*